United States Patent Office 2,726,150
Patented Dec. 6, 1955

2,726,150

HERBICIDAL COMPOSITION AND METHOD OF MAKING SAME

Frederick J. Wolter, Wilmington, Del., assignor to E. I. du Pont de Nemours and Company, Wilmington, Del., a corporation of Delaware No Drawing. Application October 3, 1952, Serial No. 313,044

4 Claims. (Cl. 71—2.6)

This invention relates to herbicides. More particularly it relates to fluid herbicidal compositions containing a finely divided solid phenyl alkyl urea herbicidal agent dispersed in a mixture of an organic liquid and water. The fluid compositions of the invention also contain an emulsifying agent and are readily dispersible in water for the formation of dilute aqueous spray compositions.

The phenyl alkyl ureas employed in the compositions and methods of the invention are represented by the formula:

(1) 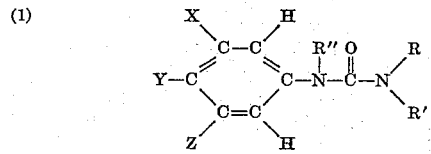

where R is alkyl having less than three carbon atoms, i. e., methyl or ethyl; R' is hydrogen or alkyl having less than five carbon atoms; R" is hydrogen or methyl; X and Z are hydrogen or halogen; and Y is hydrogen, halogen, alkyl or alkoxy, the alkyl radical in said alkyl and alkoxy substituents containing up to three carbon atoms.

Illustrative of phenyl alkyl ureas responding to the above formula are:

3-(p-chlorophenyl)-1,1-dimethylurea
3-(3,4-dichlorophenyl)-1,1-dimethylurea
3-phenyl-1,1-dimethylurea
3-(m-chlorophenyl)-1,1-dimethylurea
3-(3,4-dichlorophenyl)-1-methylurea
3-(p-chlorophenyl)-1-methylurea
3-(p-chlorophenyl)-1,1,3-trimethylurea
3-(p-chlorophenyl)-1-methyl-1-sec.-butyl urea
3-(3-chloro-p-tolyl)-1,1-dimethylurea
3-(3,5-dichloro-p-tolyl)-1,1-dimethylurea
3-(3-chloro-4-methoxyphenyl)-1,1-dimethylurea
3-(3-chloro-4-isopropylphenyl)-1,1-dimethylurea
3-(3-chloro-4-allyloxyphenyl)-1,1-dimethylurea
3-(3-chloro-p-tolyl)-1-methylurea
3-(3-chloro-p-tolyl)-1-methyl-1-isopropylurea
3-(p-chlorophenyl)-1-methyl-1-ethylurea
3-(p-chlorophenyl)-1-methyl-1-isopropylurea
3-(3,4-dichlorophenyl)-1-methyl-1-ethylurea
3-(m-chlorophenyl)-1-methyl-1-isopropylurea
3-(p-bromophenyl)-1,1-dimethylurea
3-(3,4-dibromophenyl)-1,1-dimethylurea
3-(m-fluorophenyl)-1,1-dimethylurea
3-(p-iodophenyl)-1,1-dimethylurea
3-phenyl-1-methyl-1-ethylurea
3-(p-chlorophenyl)-1-methyl-1-n-propylurea
3-(3-chloro-4-ethylphenyl)-1-methyl-isopropylurea
3-(3-chloro-4-ethylphenyl)-1,1-dimethylurea
3-(3-bromo-4-chlorophenyl)-1,1-dimethylurea
3-(3-bromo-p-tolyl)-1,1-dimethylurea
3-(3-chloro-p-tolyl)-1-methylurea
3-(3,4-dichlorophenyl)-1,1,3-trimethylurea
3-(p-tolyl)-1,1-dimethylurea
3-(p-tolyl)-1-methylurea
3-(3,4-dichlorophenyl)-1-methyl-1-isopropylurea The phenyl alkyl ureas employed in the compositions and methods of the invention can be prepared by conventional methods, for example, by reaction of a primary or secondary aliphatic amine with an appropriate aromatic isocyanate. The following equation illustrates:

(2) 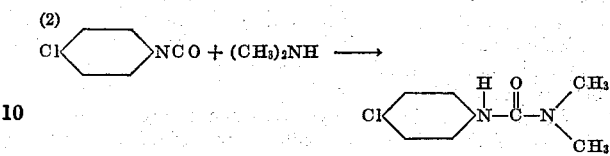

The amine-isocyanate reaction can be readily carried out by first adding the isocyanate reactant to an inert solvent such as toluene, benzene, chlorobenzene, or dioxane at about room temperature followed by gradual addition of the amine reactant. The reaction is exothermic and is conveniently carried out in the temperature range of 25 to 75° C. The urea reaction products employed in the compositions and methods of the invention are white crystalline solids and they ordinarily separate out from the reaction mass on cooling.

The organic liquids used in the compositions and methods of the invention are water immiscible. By water immiscible, I mean that they have a solubility in water of less than about 5% by weight at 30° C. They are not solvents for the phenyl alkyl ureas. That is, they do not dissolve more than about 0.1% of the urea at 30° C. They have a viscosity above about 25 S. U. S. at 100° F. In general, it will be found impractical to use organic liquids having viscosities in excess of 10,000 S. U. S. at 100° F.

Preferably, the organic liquids are petroleum hydrocarbon fractions obtained from paraffin base petroleum, such as diesel oil, lubricating oils, and mineral oil. Other liquid hydrocarbons, aromatic or alicyclic, and such materials as the polyhalogenated lower alkanes that are not solvents for the phenyl alkyl urea can be used in the compositions and methods of the invention.

The emulsifying agents employed in the compositions and methods of the invention are preferably those adapted for effecting a dispersion of oil in water although the water-in-oil type will be favored if it is desired to use an oil diluent instead of water in making a spray composition from the compositions of the invention. Preferably the emulsifying agents are of the non-ionic type. Illustrative of such emulsifying agents are polyoxyethylene derivatives of sorbitan esters of long chain fatty acids such as the proprietary product currently marketed as "Tween 81", alkylated aryl polyether alcohols such as the proprietary product "Triton X-45," fatty acid condensation products of polyhydric alcohols such as the proprietary product "Emcol H-56."

Anionic oil-in-water emulsifying agents can also be used. The most useful members of this type are those which are salts of long carbon chain sulfates or long carbon chain sulfonates and similar anionic materials which are not easily precipitated in hard water. Thus the salts such as sodium oleate and sodium stearate are much less desirable, because the anion is precipitated in hard water.

Illustrative of the more effective class of anionic emulsifying agents are amine salts of sulfonated animal and vegetable oils, salts such as sulfonated fish and castor oils, diethyl cyclohexyl amine salt of dodecyl sulfate.

Other nonionic and anionic emulsifying agents are listed in detail in the U. S. Department of Agriculture Bulletin E–607 and in articles by McCutcheon in Soap and Sanitary Chemicals, August, September and October of 1949.

The liquid emulsifiable compositions of the invention are prepared by first reducing the particle size of the solid phenyl alkyl urea herbicidal ingredient to an average particle size less than about 5 microns as determined by optical microscopy.

The desired particle size reduction is effectively carried out by first mixing the phenyl alkyl urea with part or all of the organic liquid to be used in the final composition to give a mixture of mush-like consistency. And this mixture is then ground using a multiroll mill of the type commonly known as an ink mill or paint mill. Alternatively, the oil urea mixtures can be ground in other conventional fine grinding equipment such as ball mills, disk, or cone mills.

If desired, the phenyl alkyl ureas can be ground in the absence of the oil or other diluent material using such fine grinding equipment as jet impact mills and ball mills.

The finely ground phenyl alkyl urea is then intimately mixed with the organic liquid, water, and an emulsifying agent as required to give the emulsifiable liquid compositions of the invention using conventional mixing equipment according to well accepted practices for making oil-in-water emulsions.

Conveniently the emulsifying agent, if of the oil soluble type, is first dissolved in the organic liquid-phenyl alkyl urea mixture and the water is added slowly with good agitation to the resulting mixture. Alternatively, the mix containing the organic liquid can be added to the water. And, of course, if the emulsifying agent is of the water-soluble type it is preferably added first to the water before admixture of the water with the organic liquid and phenyl alkyl urea.

The compositions of the invention contain the phenyl alkyl urea and the organic liquid in a ratio not in excess of about 2.5 parts by weight of the phenyl alkyl urea per part by weight of the organic liquid. In general, it will be found most practical to have the composition contain at least 0.1 part by weight of the phenyl alkyl urea per part by weight of the organic liquid although smaller proportions can be used if compositions having low concentrations of the active ingredient are desired. More preferably, the compositions of the invention contain 0.4 to 1.5 parts by weight of the phenyl alkyl urea per part of organic liquid.

The amount of water employed in the compositions of the invention can be varied widely. In general, it should be within the range of 0.01 to 6.0 parts by weight of water for each part by weight of the organic liquid. More preferably, the ratios are from 0.05 to 4.0 parts of water per part of organic liquid.

The amount of emulsifying agent employed in the compositions of the invention should, of course, be sufficient to impart water dispersibility to the composition; that is, the composition should be readily dispersible in water in preparing dilute aqueous spray compositions for application to unwanted plants. The amount of emulsifying agent so required will vary with the particular agent employed. In general, it will not exceed about fifteen per cent by weight of the organic liquid present in the composition and with the better and more effective agents it will be five to ten per cent by weight of the organic liquid.

It will be understood, of course, that other surface active agents such as wetting agents, suspending or dispersing agents, and thickening agents, as well as other herbicidally active agents and other pest control materials can be included if desired.

The compositions of the invention are emulsions varying in consistency with the relative amounts of the ingredients from thin milk-like dispersions to material of mayonnaise-like consistency.

In addition to the examples given above the invention is illustrated further by reference to the following examples.

Example 1

A mixture of 60 parts crystalline 3-(p-chlorophenyl)-1,1-dimethylurea and 40 parts lubricating oil was prepared. The oil was a Mid-Continent solvent treated petroleum oil, predominantly paraffinic, very low in naphthenics, with no inhibitors, with a viscosity of 300 Saybolt Universal seconds at 100° F., and with a viscosity index of about 100.

This mixture was milled by six successive passes through a Kent 3-roll ink mill, with 4 inch rolls set at 0.001 to 0.0015 inch clearance, until the 3-(p-chlorophenyl)-1,1-dimethylurea was uniformly dispersed as very fine particles, less than 5 microns, with most of the particles being 1 micron or less. This dispersion was in the form of a thick putty-like paste.

An aqueous dispersion of this paste, containing 30% 3-(p-chlorophenyl)-1,1-dimethylurea was prepared as follows:

Ten parts by weight of lubricating oil, 50 parts by weight of the milled putty-like paste, and 3 parts by weight of polyoxyethylene sorbitan monooleate ("Tween" 81) emulsifying agent were thoroughly mixed. To the resulting smooth paste was added slowly in small increments with good mixing 3 parts by weight of a 1% aqueous solution of the sodium sulfate derivative of 7-ethyl-2-methyl undecanol-4 ("Tergitol" 4). To the resulting smooth paste was then added 34 parts by weight of water in small increments with efficient mixing. This resulted in a smooth, fluid, creamy dispersion.

This concentrated dispersion was diluted with water to a concentration of 1.5% by weight 3-(p-chlorophenyl)-1,1-dimethylurea for use as an herbicidal spray composition. At this 3-(p-chlorophenyl)-1,1-dimethylurea concentration, a good dispersion is maintained with a minimum of agitation.

Example 2

A mixture of 60 parts crystalline 3-(p-chlorophenyl)-1,1-dimethylurea and 40 parts ordinary diesel oil was prepared. This mixture was milled by six successive passes through a Kent 3-roll ink mill, with 4-inch rolls set at a clearance of 0.001 to 0.0015 inch, to obtain a dispersion in which the 3-(p-chlorophenyl)-1,1-dimethylurea is present as fine particles below 5 microns, with most of the particles being less than 1 micron. This dispersion is in the form of a thick putty-like paste.

An aqueous dispersion containing 25% 3-(p-chlorophenyl)-1,1-dimethylurea was prepared from this paste as follows:

8.3 parts by weight of diesel oil, 41.7 parts by weight of the milled putty-like paste, and 2.5 parts by weight of "Triton" X-45 (oil-soluble alkylated aryl polyether alcohol) emulsifying agent were thoroughly mixed. To the resulting smooth paste was added slowly in small increments with good mixing 2.5 parts by weight of 1% aqueous solution of "Tergitol" 4. To the resulting smooth paste was then added 45.0 parts by weight of water in small increments with efficient mixing. This resulted in a smooth, creamy, rather viscous, thixotropic dispersion which was easily dilutable with water.

This concentrated dispersion was diluted with water to a concentration of 1.5% by weight 3-(p-chlorophenyl)-1,1-dimethylurea for use as an herbicidal spray composition. At this 3-(p-chlorophenyl)-1,1-dimethylurea concentration, a good dispersion is maintained with a minimum of agitation.

Example 3

A mixture of 60 parts crystalline 3-(p-chlorophenyl)-1,1-dimethylurea and 40 parts refined mineral oil was prepared. The refined mineral oil was liquid petrolatum, U. S. P. grade paraffin oil, with a viscosity of 360 Saybolt Universal seconds at 100° F. This mixture was milled by six successive passes through a Kent 3-roll ink mill, with 4-inch rolls set at a clearance of 0.001 to 0.0015 inch, to obtain a dispersion in which the 3-(p-chlorophenyl)-1,1-dimethylurea is present as fine particles below 5 microns in size, with most of the particles being less than 1 micron.

An aqueous dispersion of this paste was prepared as follows:

Four parts of an oil soluble emulsifier, "Atlox" 1045A (polyoxyethylene sorbitol oleate-laureate) was stirred into 100 parts of the paste. Water was added gradually, with efficient mixing, to emulsify the oil, and when 96 parts water was added, the composition was a smooth creamy dispersion containing 30% 3-(p-chlorophenyl)-1,1-dimethylurea. Further dilution to 6% 3(p-chlorophenyl)-1,1-dimethylurea, by the addition of 800 more parts water, yielded a dispersion in which the 3-(p-chlorophenyl)-1,1-dimethylurea, which tended to settle in a fine precipitate, was easily resuspended by mild agitation. This suspendability was maintained in further dilution to 1.5% 3-(p-chlorophenyl)-1,1-dimethylurea.

Certain of the compounds responding to formula (1) and herbicidal compositions and methods employing them are claimed in coassigned, copending applications Serial No. 271,632, filed February 14, 1952; Serial No. 271,631, filed February 14, 1952; Serial No. 271,633, filed February 14, 1952; Serial No. 271,634, filed February 14, 1952; and Serial No. 273,767, filed February 27, 1952.

I claim:

1. A fluid herbicidal composition comprising an emulsion containing an organic liquid phase, a water phase, an emulsifying agent in amount sufficient to impart water dispersibility to the composition, and dispersed in said emulsion as an essential herbicidally active ingredient a particulate phenyl alkyl urea the particles of which have an average size less than 5 microns, said organic liquid being a water immiscible liquid in which the urea has a solubility less than about 0.1% at 30° C. and having a viscosity greater than about 25 S. U. S. at 100° F., and said phenyl alkyl urea being represented by the formula

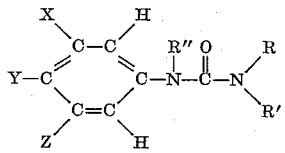

where R is alkyl of less than 3 carbon atoms; R' is selected from the group consisting of hydrogen and alkyl of less than 5 carbon atoms; R" is selected from the group consisting of hydrogen and methyl; X and Z are selected from the group consisting of hydrogen and halogen; and Y is selected from the group consisting of hydrogen, halogen, alkyl and alkoxy, the alkyl radical in said alkyl and alkoxy substituents containing up to three carbon atoms.

2. A liquid herbicidal composition comprising an emulsion containing an organic liquid phase, a water phase in amount corresponding to 0.01 to 6.0 parts by weight of water per part by weight of said organic liquid, an emulsifying agent in amount sufficient to impart water dispersibility to the composition, and dispersed in said emulsion as an essential herbicidally active ingredient from 0.1 to 2.5 parts by weight of a particulate phenyl alkyl urea per part by weight of said organic liquid, the particles of the phenyl alkyl urea having an average size less than 5 microns, said organic liquid being a water immiscible liquid in which the urea has a solubility less than 0.1 at 30° C. and having a viscosity greater than 25 S. U. S. at 100° F., and said phenyl alkyl urea being represented by the formula

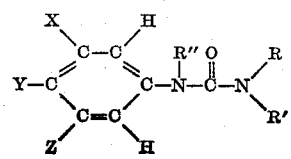

where R is alkyl of less than 3 carbon atoms; R' is selected from the group consisting of hydrogen and alkyl of less than 5 carbon atoms; R" is selected from the group consisting of hydrogen and methyl; X and Z are selected from the group consisting of hydrogen and halogen; and Y is selected from the group consisting of hydrogen, halogen, alkyl and alkoxy, the alkyl radical in said alkyl and alkoxy substituents containing up to three carbon atoms.

3. A liquid herbicidal composition comprising an oil-in-water emulsion containing a liquid paraffinic petroleum hydrocarbon fraction as a liquid dispersed phase, water as a continuous phase, said water being in amount corresponding to 0.05 to 4.0 parts by weight per part by weight of the petroleum hydrocarbon fraction, a nonionic emulsifying agent in amount sufficient to impart water dispersibility to the composition and dispersed in said emulsion as an essential herbicidally active ingredient from 0.4 to 1.5 parts by weight of a particulate phenyl alkyl urea per part by weight of the petroleum hydrocarbon fraction, the particles of the phenyl alkyl urea having an average size less than 5 microns, said petroleum hydrocarbon fraction being water immiscible having a solubility for the urea less than 0.1 at 30° C. and having a viscosity greater than 25 S. U. S. at 100° F., and said phenyl alkyl urea being represented by the formula

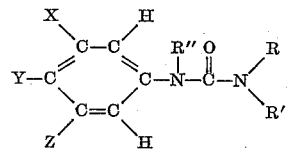

where R is alkyl of less than 3 carbon atoms; R' is selected from the group consisting of hydrogen and alkyl of less than 5 carbon atoms; R" is selected from the group consisting of hydrogen and methyl; X and Z are selected from the group consisting of hydrogen and halogen; and Y is selected from the group consisting of hydrogen, halogen, alkyl and alkoxy, the alkyl radical in said alkyl and alkoxy substituents containing up to three carbon atoms.

4. A method for the preparation of a liquid herbicidal composition comprising milling a mixture of a solid phenyl alkyl urea with a non-solvent organic liquid having a viscosity greater than about 25 S. U. S. at 100° F. until the average particle size of the urea is less than 5 microns then dispersing said milled mixture in water with the aid of an emulsifying agent, said phenyl alkyl urea being represented by the formula

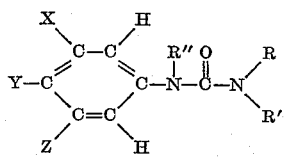

where R is alkyl of less than 3 carbon atoms; R' is selected from the group consisting of hydrogen and alkyl of less than 5 carbon atoms; R" is selected from the group consisting of hydrogen and methyl; X and Z are selected from the group consisting of hydrogen and halogen; and Y is selected from the group consisting of hydrogen, halogen, alkyl and alkoxy, the alkyl radical in said alkyl and alkoxy substituents containing up to three carbon atoms.

References Cited in the file of this patent

UNITED STATES PATENTS 2,446,836    King _____ Aug. 10, 1948